PATH SELECTOR FOR USE IN A SWITCHING NETWORK
Filed Nov. 15, 1965
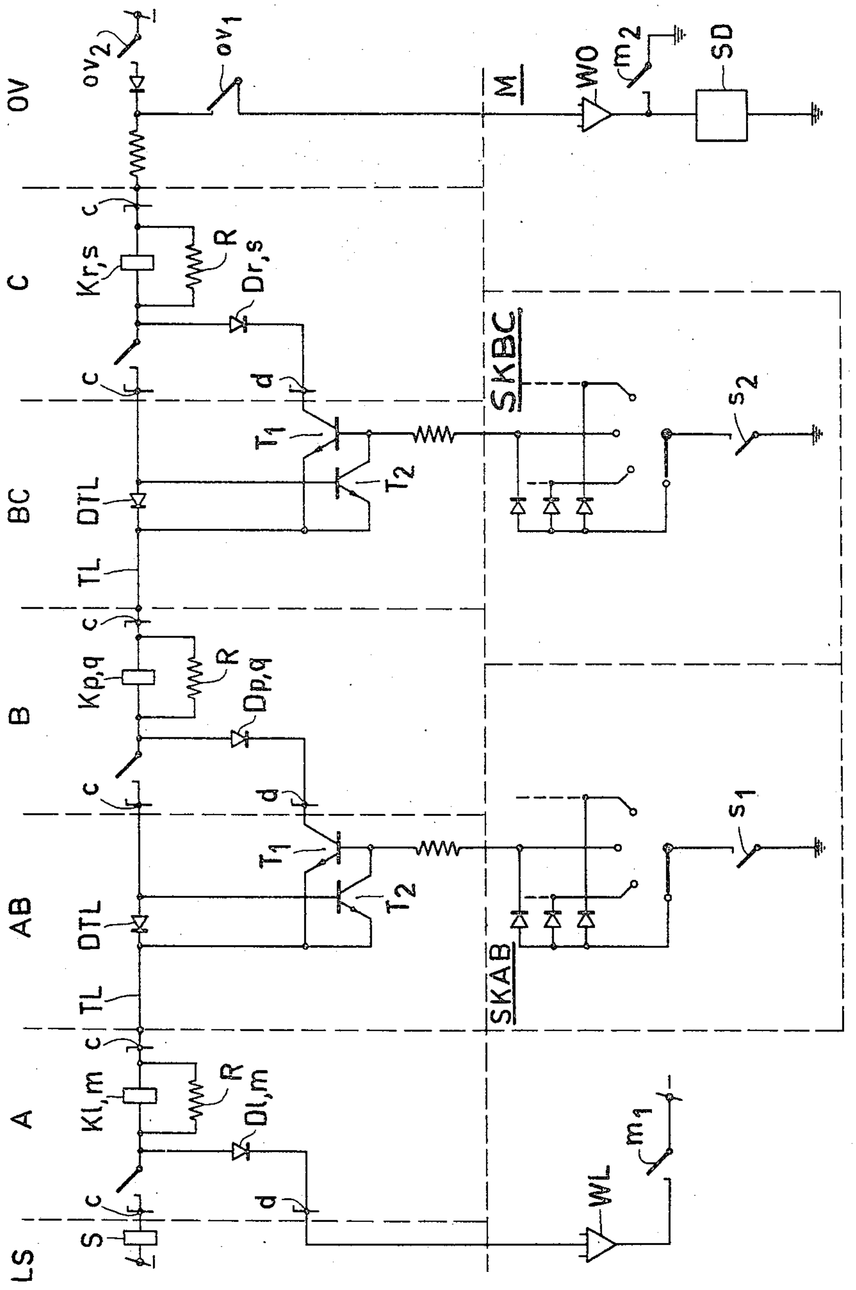
INVENTOR.
ROBERT B. BUCHNER
BY
AGENT United States Patent Office 3,489,854
Patented Jan. 13, 1970

3,489,854
PATH SELECTOR FOR USE IN A SWITCHING NETWORK

Robert Bertold Buchner, Hilversum, Netherlands, assignor, by mesne assignments, to U.S. Philips Corporation, New York, N.Y., a corporation of Delaware Filed Nov. 15, 1965, Ser. No. 507,877
Claims priority, application Netherlands, Nov. 18, 1964, 6413386
Int. Cl. H04j 1/02
U.S. Cl. 179—15 2 Claims

ABSTRACT OF THE DISCLOSURE

The present invention relates to switching exchanges and more particularly to ones in which one of many possible paths is selected between selected input and output terminals. This is done with link selectors and controlled switches without the need for additional matrix wires.

The invention relates to a switching network for use in an automatic communication exchange, particularly an automatic telephone exchange, comprising a number of switching stages interconnected by intermediate lines and composed of switching matrices, wherein a plurality of communication paths can be established between each input and each output of the switching network.

It has been proposed that a switching network of the kind set forth, in which the presence of a free communication path between an input and an output of the switching network is indicated and one free communication path is selected by using a separate network of wires associated with the intermediate lines and arranged in parallel with the intermediate lines. The adjustment of a selected communication path is achieved in this case with the aid of a marking or adjusting signal, which is passed from each switching stage to the next-following stage.

In prior art devices extra wires were needed between switching networks with an obvious increase in cost and complexity. In addition, the switching relays are sequentially energized taking a much longer time than is possible with parallel operation.

The invention has for an object to provide a novel type of switching network as set forth above, in which the indication, the selection, the adjustment and the maintenance of a communication path are achieved by using the same wires (*c*-wires). As compared with the switching network already proposed a far-reaching simplification is obtained since the separate network of wires associated with the intermediate lines may be dispensed with.

A switching network according to the invention is characterized in that the control-wires of the intermediate lines included in any arbitrary communication path, connects each switching stage through the series combination of a matrix contact and a holding winding of a matrix relay, and also connects each of a number of consecutive switching stages through a circuit connected in parallel with said series combination, said circuit including the series combination of a controllable switch joined individually to the intermediate line and an energizing winding of said matrix relay.

A further advantage of the switching network according to the invention consists in that subsequent to the selection of a free communication path this path can be established by the simultaneous energization of all matrix relays, so that the time of adjustment of the connection is considerably reduced as compared with switching networks in which the matrix relays are sequentially energized.

The invention will be described more fully with reference to the drawing.

The switching network shown in the drawing is composed of a number of switching stages A to C, each comprising a plurality of matrix switches. The complete network is well known and is described in FIG. 1 of U.S. Patent No. 3,310,633, while the construction of each crosspoint is disclosed in FIG. 2 of U.S. Patent No. 3,349,187. The matrix switches of the switching stage A are connected through intermediate lines TL to the matrix switches of the switching stage B and the latter are connected through intermediate lines TL to the matrix switches of the switching stage. The inputs of the switching network have connected to them subscriber lines through line current circuits LS and the outputs of the switching network have connected to them register connecting paths through transmitting members OV. The network comprises furthermore link or intermediate-line selectors SKAB and SKBC, which are joined to the intermediate lines between the switching stages A and B and between B and C respectively. There is furthermore provided a marker M which leads through the selecting circuits WL and WO to the inputs and the outputs of the switching network.

A plurality of communication paths can be established between each input and each output of the switching network. The drawing illustrates one possible communication path in the switching network. The communication path is established through the crossing K*l*, *m* of an A-switch, an intermediate line TL between the switching stages A and B, the crossing K*p*, *q* of a B-switch, an intermediate line TL between the switching stages B and C and the crossing K*r*, *s* of a C-switch. Each crossing comprises a relay with a relay winding and a plurality of relay contacts. Two of these contacts serve for connecting further the speech wires (*a*- and *b*-wires) and the third contact serves for switching on the signalling wire (*c*-wire). The contact shown in the drawing is the *c*-wire contact. The *a*- and *b*-wire contacts have no particular function in establishing a communication path and are omitted for the sake of clarity. It should be noted here that apart from the speech wires only one wire, i.e. the *c*-wire is taken through the switching network and that all information and control-signals required for the establishment of a communication path are passed via said *c*-wire through the switching network.

The matrix switches have a plurality of inputs and outputs and each incoming *c*-wire is connected to each outgoing *c*-wire through the series combination of a make-contact and a winding of a relay. The connecting points between the relay contacts and the relay windings of series combinations connected to the same *c*-wire are each connected through a diode to an associated *d*-wire. The *d*-wire does not extend over a number of switching stages like the *c*-wire, and the matrix switches have therefore no *d*-wire contacts. The *d*-wire may be considered as a fourth input wire beside the *a*-, *b*- and *c*-wires and will be taken as such in the following description.

When a subscriber makes a call and the resultant state of all of the line current circuit LS is detected and the marker is free, the latter is connected through a selecting switch WL to the line current circuit of the calling subscriber and applies by closing a contact *m* a negative potential to the *d*-wire of the relevant input of the A-switch. This *d*-wire is connected to each outgoing *c*-wire through the series combination of a diode D*l*, *m* and a relay winding *Kl, m*. Along these paths the negative potential of the *d*-wire reaches the free outgoing *c*-wires. The occupied outgoing *c*-wires are at a busy potential which is more negative than the negative potential of the *d*-wire, so that the diodes between the *d*-wire and the occupied, outgoing $c$-wires are cut off and will not be affected by the negative potential of the $d$-wire.

In the further switching stages B and C the $c$-wire of each incoming intermediate line and the $d$-wire of the relevant input have connected between them the emitter-collector path of a transistor $T_1$, connected as a controllable switch. Said transistors are connected through base resistors to the outputs of the link selectors SKAB and SKBC. Between the $c$-wire of each incoming intermediate line and the $c$-wire of the relevant input of the switch there is connected a diode DTL. When the $c$-wire is occupied, this diode is traversed by a current in the pass direction, so that a given voltage is operative across said diode. This voltage is applied as the emitter-base control-voltage to a transistor $T_2$, the emitter electrode of which is connected to the emitter-electrode of the transistor $T_1$ and the collector electrode of which is connected to the base electrode of the transistor $T_1$. When the intermediate line is occupied, the voltage across the diode drives the transistor $T_2$ in the saturation state. The transistors $T_1$ and $T_2$ are of a type in which the collector-emitter voltage in the saturation state is lower than the emitter-base voltage at which the transistor starts passing current, so that the transistor $T_1$ cannot be conducting, when the transistor $T_2$ is saturated, that is to say, when the intermediate line is occupied.

For structural reasons the transistors $T_1$ and $T_2$ and the diodes DTL are arranged in the B-C switch, where the intermediate line concerned terminates, with which switch they are structurally integral. The switches thus constructed have three wire outputs and three wire inputs. An exception is formed by the A-switches, only the $d$-wires of which are separated in order to provide access to the inputs of the A-switch for the marker.

The link circuits SKAB and SKBC have each a rest position in which the wiper of the selector is connected through the diodes to all the outputs. Between these wipers and earth there are connected contacts $s_1$ and $s_2$, which are closed when the marker is operating, so that the base electrodes of all the transistors $T_1$ are connected through base resistors to earth. The transistors $T_1$, joined to occupied intermediate lines, remain cut off, whereas the transistors $T_1$ joined to free intermediate lines, the $c$-wires of which are at negative potential, become conducting. As a result the negative potential of a free incoming $c$-wire is transferred through the emitter-collector path of the transistor $T_1$ to the corresponding $d$-wire. The negative potential of the $d$-wire is then transferred in the manner described above for the A-switch to the free outgoing $c$-wires. In this manner the negative potential applied by the marker to the output spreads in a fan-like fashion through free intermediate lines and finally this negative potential becomes manifest on the $c$-wires of one or more transmitting members. By means of the selection circuit WO, the marker selects one of these free transmitting members. To this end the marker connects the $c$-wires of the transmitting member in order of succession to earth through a high-ohmic detection member SD. The current detection member responds, when the $c$-wire of the free transmitting member is at negative potential and stops the selection circuit WO. In the drawing $ov_1$ designates a contact, which is interrupted when the transmitting member is occupied. The response of the current detection member SD is a sign for the marker that there is at least one free communication path between the calling line current circuit and a free transmitting member. The marker then starts the link selector SKAB, which thus leaves the zero position and passes in order of succession through its various positions. After the start from the zero position the connection between the output and earth through the diodes is interrupted and in the other position one output is each time connected to earth. The link selector continues stepping on until the current detection member responds again. Then the link selector SKAB remains in the attained position. The result is that only one transistor $T_1$ will be conducting between the switches A and B. The first portion of a communication path is thus fixed unambiguously. Subsequently, the marker starts the link selector SKBC, which selects in a similar manner a transistor $T_1$ between the switching stages B and C. Thus also the second portion of the communication path is determined unambiguously. Then a single current path is established between the input of the switching network and its output. The possible communication path shown in the drawing between the input and the output of the switching network is supposed to be the communication path selected in the manner described above. The link selectors SKAB and SKBC are in their upper positions. The single current path established is as follows: negative potential, selection circuit WL, $d$-wire, A-switch, $c$-wire intermediate line TL, transistor $T_1$, $d$-wire, B-switch, $c$-wire intermediate line TL, transistor $T_1$, $d$-wire, C-switch, $c$-wire transmitting member, selection circuit WO, current detection member SD, earth. At each crossing current passes through the series combination of a diode and the parallel combination of a resistor R and a relay winding. The resistor serves to reduce the time constant of the relay winding. As a result the current through the current path can rise rapidly, so that the link selectors can be driven at a high rate. The current passing through the aforesaid path is very low owing to the high internal resistance of the current detection device SD and is not capable of closing the matrix relays. The marker then closes the marking contact $m_2$, which short-circuits the current detection member SD. The current through the windings of the relays at the crossings thus increases to an extent such that these relays are simultaneously attracted and pass on the connection via the matrix contacts. The attraction of the relays is performed at the same instant, so that the selected free communication path is carried through very rapidly. The attraction of the relay K$l$, $m$ in the A-switch causes the $c$-wire of the line current circuit to be connected to the outgoing $c$-wire, so that a separation relay S in the line current circuit is closed. The winding of this relay is connected between the $c$-wire of the switch and a point, the negative potential of which is more negative than the negative potential of the $d$-wire. The contacts of relay K$p$, $q$ and of the relay K$r$, $s$ in the B- and C-switches respectively connect the $c$-wire further and thus close each a holding circuit, which is independent of the energizing current circuit. The relays at the crossings are thus held independently of the link selectors, in which the contacts $s_1$ and $s_2$ can then be opened. In the transmitting member a current path, also independent of the marker, is closed through a contact $ov_2$ and a point of negative potential, which is chosen so that after busy contact $ov_1$ is opened, a current passes through the windings of the matrix relays, the latter being thus held in the attracted positions. The holding current may be much lower than the energizing current, so that current can be economized. By raising the holding current, tax counting pulses may be passed from the transmitting member to the tax counter included in the line current circuit without the need for using an additional counting wire.

In the example described above the calling subscriber receives the dialling tone from the register connected to the register connected path. The marker and the link selectors can be released for dealing with new calls either from a calling subscriber or from a calling register to establish a communication path to the calling subscriber.

The $c$-wires of the intermediate lines of the communication paths carry a holding current which cuts off, in the manner described, thoses transistors $T_1$ which are joined to the intermediate lines concerned; which can thus no longer be selected by the link selectors. Selection can be carried out again only after the established connection is interrupted by the opening of the contact $ov_2$.

It should be noted that in practice the relays at the crossings are not attracted accurately at the same instant due to the differences in the energizing times of the relays.

However, this is unobjectionable for the switching network described above, since even if the relays are not simultaneously attracted, the setting current path remains closed through the transistors $T_1$. The attraction of a relay is thus quite independent of the attraction of a further relay, so that the communication path is established in a reliable manner.

In practical switching networks the number of outputs of the link selectors may be much smaller than the number of intermediate lines, since it is possible to connect a plurality of transistors in a multiple manner to the same output without involving the risk of undesirable double connections being established. The reduction of the number of outputs depends upon the arrangement of the relays at the crossings in the switching stages and under given conditions there may be many intermediate lines between the switching stages.

What is claimed is:

1. A switching network for use in an automatic telephone exchange comprising:

a plurality of switching stages each including a matrix contact and a holding winding of a matrix relay coupled in a series combination;

a plurality of intermediate lines coupling each of said switching stages to a plurality of said switching stages, respectively in series, whereby a plurality of communication paths can be established between pairs of said switching stages through said switching network;

and means for providing alternate paths between said switching stages without additional intermediate lines and a plurality of externally controllable switches coupled to said series combinations in parallel respectively, whereby said alternate paths may be established independently of any signals on said intermediate lines.

2. A switching network as in claim 1 further comprising a plurality of resistors shunting said holding winding of said matrix relays respectively.

References Cited

UNITED STATES PATENTS

| | | | |
|---|---|---|---|
| 2,348,626 | 5/1944 | Holden | 178—18 XR |
| 2,844,811 | 7/1944 | Burkhart | 340—166 |
| 3,221,102 | 11/1965 | Merz | 179—15 |
| 3,286,234 | 11/1966 | Hogrefe | 340—166 |
| 3,310,633 | 3/1967 | Schonemeyer | 179—18 |
| 3,343,129 | 9/1967 | Schmitz | 179—18 XR |
| 3,349,187 | 10/1967 | Bray et al. | 179—18 |

JOHN W. CALDWELL, Primary Examiner

CARL R. VONHELLENS, Assistant Examiner

U.S. Cl. X.R.

179—18; 340—166